Jan. 12, 1965   W. J. BURKE   3,164,939
PORTABLE APPARATUS FOR HEAT SHRINKING FILM ABOUT OBJECTS
Filed Nov. 4, 1963
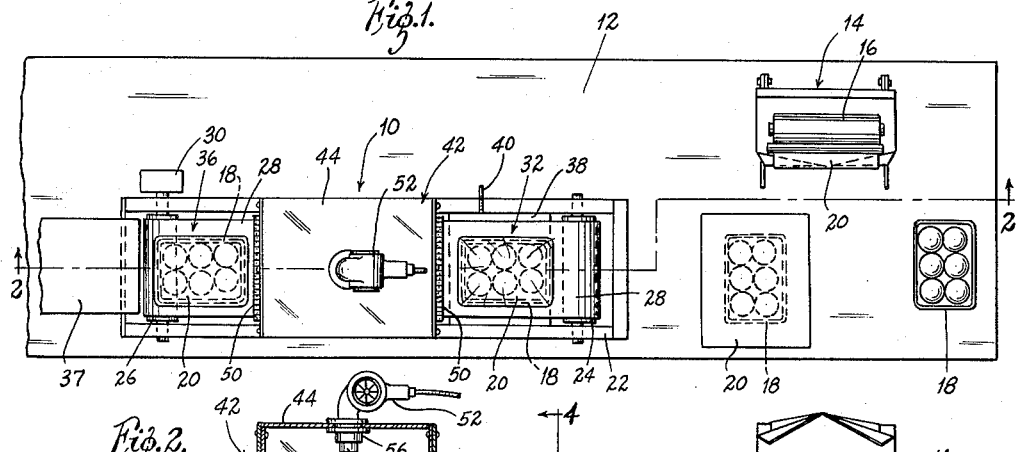
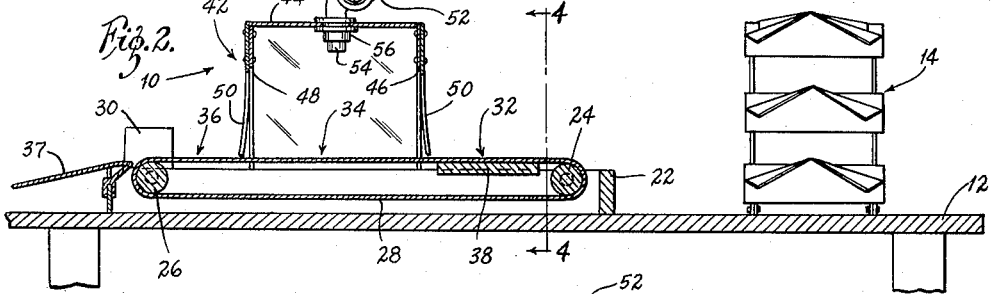
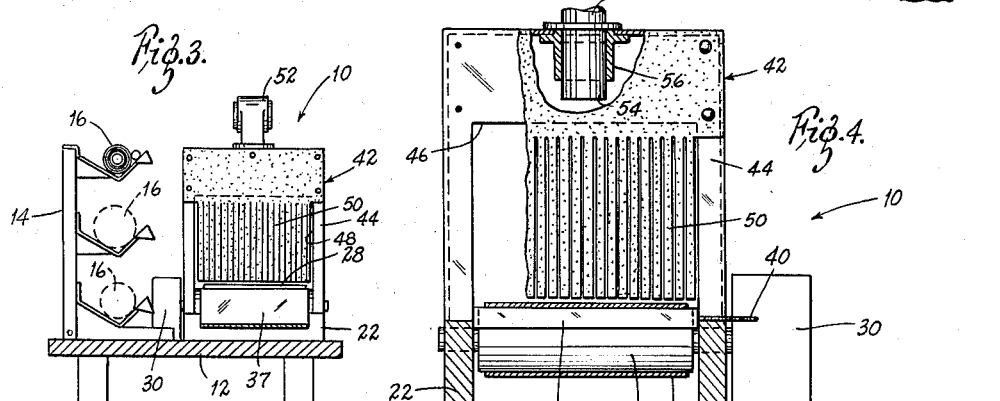
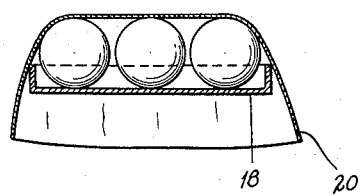
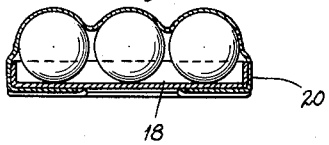
INVENTOR:
WILLIAM J. BURKE,
BY Kingsland, Rogers, Ezell & Robbins
ATTORNEYS United States Patent Office 3,164,939
Patented Jan. 12, 1965

3,164,939
PORTABLE APPARATUS FOR HEAT SHRINKING FILM ABOUT OBJECTS
William J. Burke, St. Louis, Mo., assignor to Roll-O-Sheets, Inc., St. Louis, Mo., a corporation of Missouri
Filed Nov. 4, 1963, Ser. No. 321,025
4 Claims. (Cl. 53—379)

This invention relates to improvements for apparatus for heat shrinking a plastic wrapping film about various objects, such as packages and the like, and, in particular, is concerned with such an apparatus that is portable and may be conveniently mounted upon a work table or other flat surface.

By means of this invention there has been provided a compact, rugged, and relatively inexpensive portable apparatus for heat shrinking plastic film about various packages, articles, and objects, which is simple and convenient to use. With the advent of heat shrink film, such films have been used in wrapping food packages, as an example, as well as a long line of other objects. This is conventionally accomplished by wrapping the package and then subjecting the film to a hot air environment.

Through this invention, a simple apparatus has been provided that can be used by relatively unskilled clerks and the like in grocery stores, or other retail establishments. The wrapped object loosely wrapped with the plastic heat shrinkable film is adapted to be subjected to a slight amount of heat to tack the overlapping or fringe edges of the film to cause them to cohere together by placing them upon a heated loading end of an endless belt. The wrapped film is then moved upon an endless conveyor through a shrink tunnel, which is provided with a hot air environment by a hot air blowing means. In the shrink tunnel the plastic film is shrunk tightly about the package to provide a tightly wrapped wrapper, and, after being so subjected to heat in the tunnel, the wrapped object is moved along the conveyor to a discharge station where it is used as desired. The tunnel is heated by a removable blower which can also be used manually to blow air upon wrapped packages upon removal from the tunnel.

The apparatus is conveniently mounted upon a flat base or frame such that the entire apparatus is portable and can be used and moved from one table to another as desired. The apparatus is rugged and simple and compact and requires only a source of electric power for providing the necessary energizing means to a hot air blower mounted upon the shrink tunnel to provide hot air in the tunnel and to provide power to an electric motor mounted upon the base to move the endless belt, and lastly to provide heating means to the electrically heated platen means to provide heat to the loading station for tacking the ends of the film together.

The above features are objects of this invention and further objects will appear in the detailed description which follows and will be otherwise apparent to those skilled in the art.

For the purpose of illustration of this invention, there is shown in the accompanying drawings a preferred embodiment thereof. It is to be understood that these drawings are for the purpose of example only and that the invention is not limited thereto.

In the drawings:

FIGURE 1 is a top plan view of the apparatus mounted upon a work table;

FIGURE 2 is a view in section taken on line 2—2 showing the structure of the base with the shrink tunnel and endless conveyor mounted thereupon;

FIGURE 3 is a view in elevation of the apparatus mounted upon the work table taken from the left side of FIGURE 1;

FIGURE 4 is a view in enlarged section taken on the line 4—4 showing the construction of the apparatus;

FIGURE 5 is an enlarged view in section taken of a tray with articles such as oranges, or the like, in a first stage of envelopment of the wrapping with the heat shrinkable plastic film; and FIGURE 6 is a view taken similarly to FIGURE 5 but showing the plastic film shrunk about the package.

Referring now to the drawings, the portable heat shrinking apparatus of this invention is generally shown by the reference numeral 10 mounted upon a table 12. The table is further provided with a multi-roll dispenser 14 provided with rolls of heat shrinkable film 16. Trays filled with oranges or other objects are indicated by the reference numeral 18. A tray at a preparatory stage of being wrapped with a plastic heat shrinkable sheet of film 20 is likewise shown on the table.

The heat shrinking apparatus 10 is provided with a base 22 as best shown in FIGURES 2 and 4. This base, in the nature of a flat rectangular frame, is further provided with two end rollers 24 and 26 about which an endless conveyor belt 28 is mounted. A motor 30 is likewise mounted upon the frame and is connected to the roller 26 to provide motor power.

The endless belt 28 is provided with three stations at the top surface, the first station being station 32 at one end, which is termed the loading station, the second station 34 being provided at an intermediate portion of the top surface, being termed the heat shrink station, and a third station 36 being positioned at the opposite end of the belt and being termed a discharge station. A metal ramp 37 is hooked upon the base to discharge the wrapped packages upon the table. Underneath the loading station a heat platen 38 is mounted upon the frame to provide heat to the loading station. The heat platen is electrically heated and is provided with an electrical lead 40 for connection to an electrical outlet, as will be well understood in the art.

The heat shrinking zone 34 at the intermediate portion of the top surface of the endless belt is provided by means of a heat shrink tunnel 42, best shown in FIGURES 1, 2, 3 and 4. As there shown, it is comprised of a housing 44 having an inlet opening 46 and an outlet opening 48. These are closed to provide for confinement of heat by means of flexible curtains 50 which are vertically slit so as to accommodate the movement of film wrapped objects carried through the tunnel by means of the endless belt. A portable hot air blower 52 is mounted upon the top of the housing and is provided with an electrical lead to provide power for the electrical heating element and electric motor in the blower. The blower has an outlet nozzle 54 directed into the housing and removably supported in a sleeve 56 to provide the hot air blowing means for heating the tunnel.

*Use.*—The portable apparatus of this invention is very simply adapted to be used. A gorcery clerk or other retail clerk first of all obtains a package, such as oranges or the like in the form of the tray 18. A sheet of heat shrinkable plastic film 20 is then torn off from the dispenser 14 and placed over the object or package. The ends of the film are loosely wrapped together and then placed upon the loading station 32 where the heat from the platen means 38 causes the overlapping fringes to shrink and cohere together. The loosely wrapped package is then carried by the endless belt into the heat shrink tunnel 42. In the heat shrink tunnel the hot air provided by the hot air blower 52 causes the film to shrink rapidly about the package in the form shown in FIGURE 6. As the object, or as shown in these drawings the tray filled with oranges or the like, is shrunk to the final form, it is discharged to the end of the conveyor at the discharge station 36. It is then caused to move off the apparatus where the clerk can move it to any other desired storage point.

The hand operated blower may be simply removed from the apparatus by withdrawing it from the sleeve 56. It may then be used manually to shrink film about packages that may be too large to pass through the tunnel or can be used in any other fashion desired.

It will be apparent that the apparatus can be employed in any desired manner to wrap objects of very diverse nature with the heat shrinkable plastic film. The apparatus is adaptable and can be very simply employed with a minmum of experience that only requires a source of electrical power for operation of all the moving and heating components.

Various changes and modifications may be made within this invention as will be readily apparent to those skilled in the art. Such changes and modifications are within the scope and teaching of this invention as defined by the claims appended hereto.

What is claimed is:

1. Portable apparatus adapted to mount on a table for heat shrinking a plastic film wrapped about an object, said apparatus comprising a flat base adapted to rest on a table or the like, said base being in the form of a rectangular frame composed of elongated side and end wall members, said wall members defining a central opening, endless conveyor means having an endless belt positioned in said frame to substantially cover said opening, said endless belt being mounted upon rollers supported within said opening at opposite ends of said side wall members, said endless belt having a top surface provided with three stations comprising a loading station at one end, a heating station at an intermediate position and a discharge station at an opposite end of the belt, a heat platen means mounted on said side wall members underneath said loading station to provide a source of heat to cause overlapping fringe of the film wrapped about the object to cohere, a heat tunnel mounted upon said frame and positioned over the heating station, said heat tunnel being provided with a hot air blower and having inlet and exit means for passing the wrapped objects carried by said belt while preventing any subtantial loss of heat within said tunnel.

2. Portable apparatus adapted to mount on a table for heat shrinking a plastic film wrapped about an object, said apparatus comprising a flat base adapted to rest on a table or the like, said base being in the form of a rectangular frame composed of elongated side and end wall members, said wall members defining a central opening, endless conveyor means having an endless belt positioned in said frame to substantially cover said opening, said endless belt being mounted upon rollers supported within said opening at opposite ends of said side wall members, means for moving said belt comprising a motor mounted upon said base, said endless belt having a top surface provided with three stations comprising a loading station at one end, a heating station at an intermediate position and a discharge station at an opposite end of the belt, a heat platen means mounted on said side wall members underneath said loading station to provide a source of heat to cause overlapping fringe of the film wrapped about the object to cohere, a heat tunnel mounted upon said frame and positioned over the heating station said heat tunnel having inlet and exit means for passing the wrapped objects carried by said belt while preventing any substantial loss of heat within said tunnel, said inlet and exit means comprising vertically split flexible curtains covering inlet and exit openings in said tunnel.

3. Portable apparatus adapted to mount on a table for heat shrinking a plastic film wrapped about an object, said apparatus comprising a flat base adapted to rest on a table or the like, said base being in the form of a rectangular frame composed of elongated side and end wall members, said wall members defining a central opening, endless conveyor means having an endless belt positioned in said frame to substantially cover said opening, said endless belt being mounted upon rollers supported within said opening at opposite ends of said side wall members, means for moving said belt comprising a motor mounted upon said frame, said endless belt having a top surface provided with three stations comprising a loading station at one end, a heating station at an intermediate position and a discharge station at an opposite end of the belt, said discharge station being provided with an inclined ramp leading from the conveyor means to a collecting surface, a heat platen means mounted on said side wall members underneath said loading station to provide a source of heat to cause overlapping fringe of the film wrapped about the object to cohere, a heat tunel positioned over the heating station, said heat tunnel being provided with a hot air blower, said hot air blower being a portable hand operated blower removably received within a support means provided on said heat tunnel, said support means comprising an open socket in a wall of said tunnel removably receiving a hot air discharge barrel of said hand operated blower, and said tunnel having inlet and exit means for passing the wrapped objects carried by said belt while preventing any substantial loss of heat within said tunnel, said inlet and exit means comprising vertically split flexible curtains covering inlet and exit openings in said tunnel.

4. Apparatus for heat shrinking a plastic film wrapped about an object, an endless conveyor means having an endless movable transporting belt, said belt having a top surface with a loading station at one end of said belt positioned over a heat platen means and receiving heat therethrough, a heat tunnel positioned over an intermediate portion of the top surface of said belt, said heat tunnel being provided with a hot air blower and having inlet and exit means for passing the wrapped object while preventing any substantial loss of heat within said tunnel, said hot air blower being a portable hand operated blower removably received within a support means provided on said heat tunnel, said support means comprising an open socket in a wall of said tunnel removably receiving a hot air discharge barrel of said hand operated blower, and a discharge station at an end of the top surface of the belt opposite to the loading station for discharging the heat shrunken film wrapped objects.

References Cited by the Examiner

UNITED STATES PATENTS

| 2,423,237 | 7/47 | Haslacher | 53—373 X |
| 2,789,407 | 4/57 | Smallegan | 53—184 |
| 2,880,522 | 4/59 | Rollins | 53—184 X |
| 2,904,943 | 9/59 | Dreyfus et al. | 53—184 X |
| 2,906,627 | 9/59 | Payton et al. | 53—30 X |
| 3,014,320 | 12/61 | Harrison | 53—30 |

FRANK E. BAILEY, *Primary Examiner.*

TRAVIS S. McGEHEE, *Examiner.*